(12) United States Patent
Kim et al.

(10) Patent No.: US 9,795,127 B2
(45) Date of Patent: Oct. 24, 2017

(54) STEAM TYPE PEST EXTERMINATION APPARATUS

(71) Applicants: Yoo-Shin Kim, Daegu (KR); Jung-Ho Kim, Uijeongbu (KR)

(72) Inventors: Yoo-Shin Kim, Daegu (KR); Jung-Ho Kim, Uijeongbu (KR)

(*) Notice: Subject to any disclaimer, the term of this patent is extended or adjusted under 35 U.S.C. 154(b) by 113 days.

(21) Appl. No.: 14/896,759

(22) PCT Filed: Jun. 13, 2014

(86) PCT No.: PCT/KR2014/005213
§ 371 (c)(1),
(2) Date: Dec. 8, 2015

(87) PCT Pub. No.: WO2014/204139
PCT Pub. Date: Dec. 24, 2014

(65) Prior Publication Data
US 2016/0120166 A1    May 5, 2016

(30) Foreign Application Priority Data
Jun. 21, 2013 (KR) .................. 10-2013-0071306

(51) Int. Cl.
*A01M 19/00* (2006.01)
*A01M 17/00* (2006.01)
*A01B 77/00* (2006.01)

(52) U.S. Cl.
CPC ........... *A01M 17/002* (2013.01); *A01B 77/00* (2013.01); *A01M 17/00* (2013.01)

(58) Field of Classification Search
CPC combination set(s) only.
See application file for complete search history.

(56) References Cited

U.S. PATENT DOCUMENTS

| 992,140 | A | * | 5/1911 | Gardner | ............... A01C 23/025 111/120 |
| 4,108,089 | A | * | 8/1978 | van der Lely | ....... A01B 49/065 111/121 |

(Continued)

FOREIGN PATENT DOCUMENTS

| JP | 2006-129808 A | 5/2006 |
| KR | 10-2003-0041129 A | 5/2003 |

(Continued)

OTHER PUBLICATIONS

International Search Report for PCT/KR2014/005213 dated Sep. 15, 2014.

*Primary Examiner* — Christopher P Ellis
(74) *Attorney, Agent, or Firm* — STIP Law Group, LLC (57) ABSTRACT

The present invention relates to an apparatus and a method for exterminating pests by injecting high-temperature steam into the ground including sand and the like, wherein a needle rod fixing plate (20) in which a plurality of needle rods (30) is arranged and fixed at the left and right sides thereof is coupled with a lever plate (12) rotated upward and downward by an operating cylinder (10) at a backside of autonomous power equipment (2), a steam generation unit (16) is provided to generate high-temperature steam enabling insect extermination and sterilization and supply the steam to steam injection holes (36) of the needle rods (30), a steam generation unit (16) and a needle rod (30) are connected by a hose, a steam distributor (44-1, 44-2) for supplying the steam to each needle rod (30) is provided on the hose, both ends of the steam distributor (44-1, 44-2) are coupled with a cover (48) so as to be sealed, a heating wire (49) for increasing the temperature of the steam again is provided therein, the needle rods (30) are inserted and moved forward in the bowels of the earth (6) by operating the autonomous power equipment (2), and a pest extermination operation (Continued)

unit (4) includes a control unit (80) for controlling the continuous injection of steam into the ground (6) so as to exterminate insects and sterilize the ground by enabling the dry or wet high-temperature steam to continuously permeate into the ground.

5 Claims, 7 Drawing Sheets

(56) References Cited

U.S. PATENT DOCUMENTS

| | | | | |
|---|---|---|---|---|
| 4,815,234 | A * | 3/1989 | Connolly | A01M 1/2094 |
| | | | | 172/42 |
| 6,026,609 | A * | 2/2000 | Rawls | A01M 1/2094 |
| | | | | 43/124 |
| 2007/0137095 | A1 * | 6/2007 | Chen | A01M 1/2094 |
| | | | | 43/132.1 |
| 2009/0290938 | A1 * | 11/2009 | Asaoka | A01G 11/00 |
| | | | | 405/128.45 |
| 2012/0066961 | A1 * | 3/2012 | Schuster | A01M 17/002 |
| | | | | 43/132.1 |

FOREIGN PATENT DOCUMENTS

| | | |
|---|---|---|
| KR | 10-2008-0054147 A | 6/2008 |
| KR | 10-2009-0084244 A | 8/2009 |

* cited by examiner

STEAM TYPE PEST EXTERMINATION APPARATUS

CROSS-REFERENCE to RELATED APPLICATIONS

This application is the U.S. National Phase under 35 U.S.C. §371 of International Application No. PCT/KR2014/005213 filed on Jun. 13, 2014, which in turn claims the benefit of Korean Application No. 10-2013-0071306, filed on Jun. 12, 2013, the disclosures of which are incorporated by reference into the present application.

TECHNICAL FIELD

The present invention relates to a pest extermination apparatus, and in particular to a pest extermination apparatus wherein pest or harmful bacteria residing in sand, sandy soil, unhardened soft soil, greenhouse or raw land can be exterminated, thus changing soil mixed with sand into land safe from pest or harmful bacteria.

BACKGROUND ART

In a raw land like a golf course where lawn grass is covered, a lot of pests which excavate the lawn grass of a golf course or ground is residing. For this reason, a lot of pesticide is frequently sprayed, which may lead to the degradation of surrounding environment. The kinds of the pests residing in a raw land like a golf course are earth worm, mole cricket, larva, etc., of which the earth worm excretes earth excrement on the surface of the ground and will be the prey of a mole. For this reason, the mole which always searches for the prey is providing a cause for building underground tunnels or excavating the ground while residing in the raw land of the golf course. The earth worm's earth excrement on the lawn grass in a fairway of the golf course may become an obstacle which may disturb a golf ball rolling.

For this reason, a lot of pesticide is being sprayed on the raw land, for example, of a golf course.

In recent years, many countries are strictly regulating on the overuse of such pesticide for the sake of nature protection in terms of the ecofriendly policy. In compliance with the above regulation, it needs to seek another way to exterminate pests residing in the raw land like a golf course.

As the concerns on the protection of farmers from the overuse of pesticide and a people's health promotion is on the rise, it needs to seek a new way to exterminate pests in an eco-friendly manner which may substitute the spraying of pesticide.

Furthermore, harmful bacteria, for example, common bacteria or pathogenicity bacteria may be residing in a sand field formed within the area of a facility, for example, the park, a children's house, a kindergarten, a school, etc. due to pet's excrements or a bacteria exposing environment in a surrounding area. A management is required to sterilize such bacteria, but there is not any appropriate measure thereon. In a sand field formed within the area of a facility, children with weak immunity in general play using sand, for example, while building a sand castle or a toad house and playing house. In this case, the children may be directly exposed to bacteria environments. Sterilization may be carried out in such a way to use ozone water or coat each sand grain in an inorganic antibiotic agent spray or a Phytoncide method, but such a way is not effective in terms of costs and workability.

At the beach in summer, there are a lot of people who walk along a seashore barefoot holding shoes in hands. The sand field where a number of people have walked may become a breeding ground of tinea pedis. The sand of the seashore may be present mixed with city contaminants, wild animal's excrements, etc. with a high possibility. If people play using such sand, for example, while taking a sand bath or building a sand castle, they may get stomachache, eye disease, skin disease, ear disease, injury infection, etc.

To this end, if we can obtain a way to economically and easily exterminate pest and carry out sterilization in a sand field formed within the area of a facility, a seashore at a beach and a greenhouse cultivation ground, etc. which needs the extermination of pest and sterilization, it may be possible to hear a good response from a lot of people who worry about harmful sand or soil environment.

DISCLOSURE OF INVENTION

Accordingly, it is an object of the present invention to provide a steam type pest extermination apparatus wherein a sand, a sand soil, a greenhouse and a raw land can be changed in an economical and easy way into a safe place from pest or harmful bacteria which are residing in unhardened soft soil including the above sane, sand soil, greenhouse and raw land.

Technical Solution

To achieve the above objects, there is provided a steam type pest extermination apparatus in a pest extermination apparatus which is able to exterminate pest and harmful bacteria, which may include, but is not limited to, a pest extermination operation unit 4 which includes a needle rod fixing plate 20 wherein a plurality of needle rods 30 is arranged and fixed at left and right sides thereof is coupled with a lever plate 12 rotated upward and downward by an operating cylinder 10 at a backside of autonomous power equipment 2; a steam generation unit 16 which is provided to generate high-temperature steam enabling insect extermination and sterilization and supply the steam to steam injection holes 36 of the needle rods 30, a steam generation unit 16 and a needle rod 30 are connected by a hose, a steam distributor 44-1 and 44-2 for supplying the steam to each needle rod 30 is provided on the hose, both ends of the steam distributor 44-1 and 44-2 are coupled with a cover 48 so as to be sealed, a heating wire 49 for increasing the temperature of the steam again is provided therein; and a control unit 80 which controls that as the autonomous power equipment 2 operates, the needle rods 30 move forward buried in the ground 6, and the high temperature steam can be continuously injected into the ground 6.

Advantageous Effects

According to the present, it is possible to make a safe place from pest and harmful bacteria in soil in such a way to exterminate pest and sterilize bacteria using a high temperature steam which is continuously injected toward pest or bacteria which are residing in sand or sand soil or in unhardened soft soil or unhardened soft soil of a raw land or a greenhouse.

BEST MODES FOR CARRYING OUT THE INVENTION

The exemplary embodiments of the present invention will be described with reference to the accompanying drawings.

The steam type pest extermination apparatus according to an exemplary embodiment of the present invention may be configured in such a way that pest or harmful bacteria can be exterminated and sterilized using a high temperature steam, wherein the pest and harmful bacteria are residing in unhardened soft soil at a greenhouse cultivation place or a raw land or in sand or sand soil at a playground or a seashore.

Figure 1:
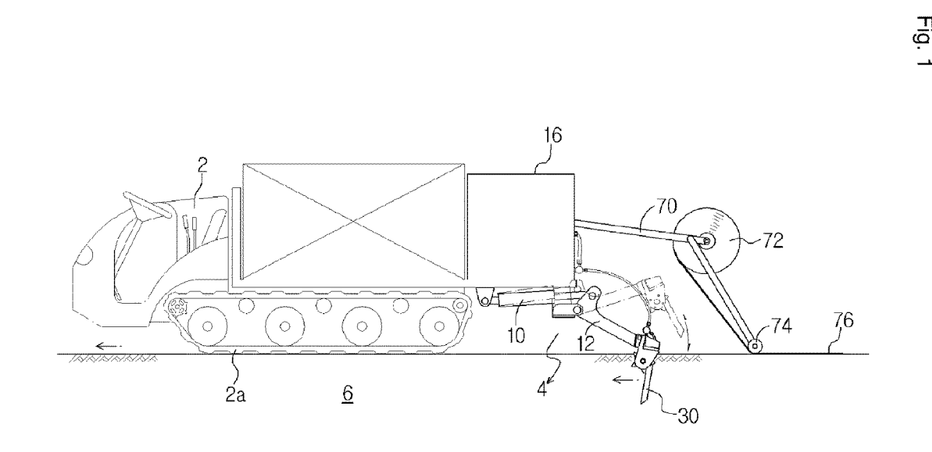
FIG. 1 is a use example view illustrating a state where a steam type pest extermination apparatus is installed at an autonomous power equipment according to an exemplary embodiment of the present invention.

As illustrated in FIG. 1, the present invention may be configured in such a way that a pest extermination operation unit 4 is engaged to an autonomous power equipment 2 like a crawler type driving force transfer vehicle, and a needle rod 30 is dragged in a state where it remains inserted into a ground 6, and the pest and bacteria can be exterminated from the ground 6 with the aid of high temperature steam which has been injected into under the ground.

More specifically, it is preferred in the present invention that the ground 6 is pest-exterminated and sterilized by injecting a high temperature steam of 90~150° C. via a steam injection hole 36 of the needle rod 30 in a state where the needle rod 30 has been inserted into the ground 6 in such a way to use the pest extermination operation unit 4 which is engaged to the autonomous power equipment 2 having caterpillar wheels 2a and equips with a plurality of the needle rods 30 and is able to allow the needle rods 30 to poke into the ground.

As illustrated in FIG. 1, in order to enhance a pest extermination effect with the aid of a high temperature steam, it is preferred to use a damp proofing cover 76. Namely, a winding-out roll 72 winding around the damp proofing cover 76 is hung at a connection support unit 70 of the autonomous power equipment 2 like a crawler type driving force transfer vehicle and is positioned at the rear of the pest extermination operation unit 4, and the damp proofing cover 76 rolled out from the winding-out roll 72 covers the ground into which a high temperature steam has been penetrated with the aid of steam injection of the pest extermination operation unit 4. Since the high temperature steam kept in the ground 6 can be kept for a long time, pest extermination effects can be enhanced.

In FIG. 1, the reference number 16 which is not described on is a steam generation unit, and 74 is a guide roll.

Figure 2:
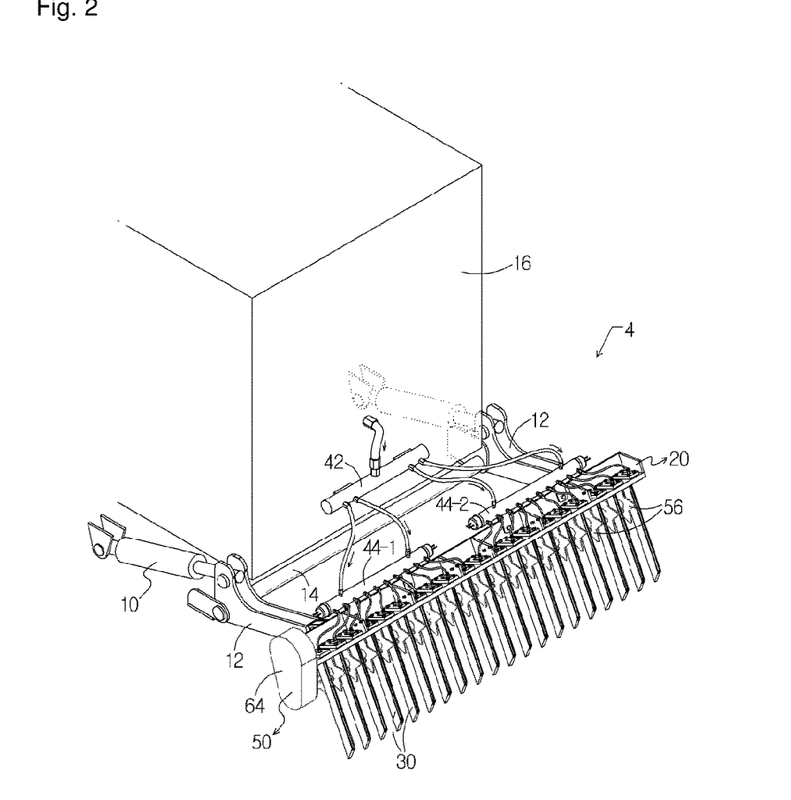
FIGS. 2 and 3 are views illustrating a configuration of a pest extermination operation unit of a steam type pest extermination apparatus according to the present invention.
Figure 3:
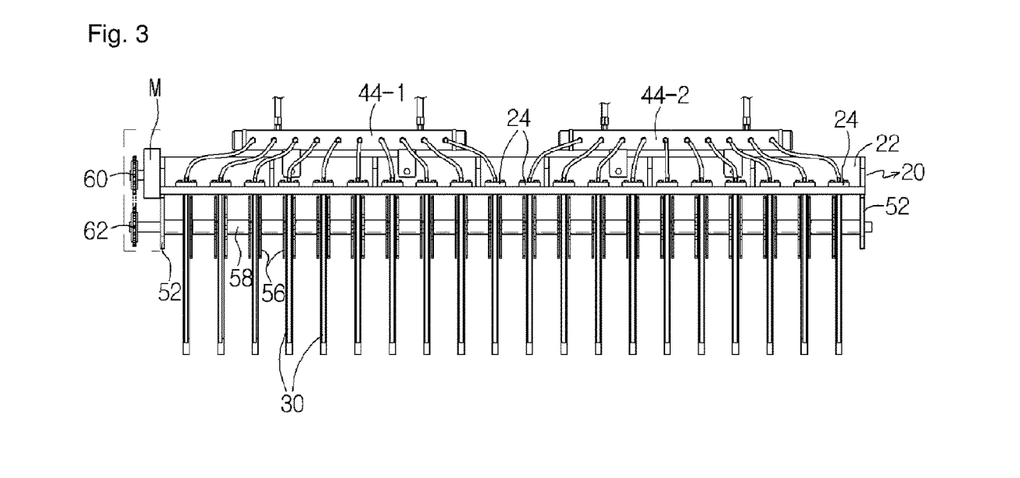
Figure 4:
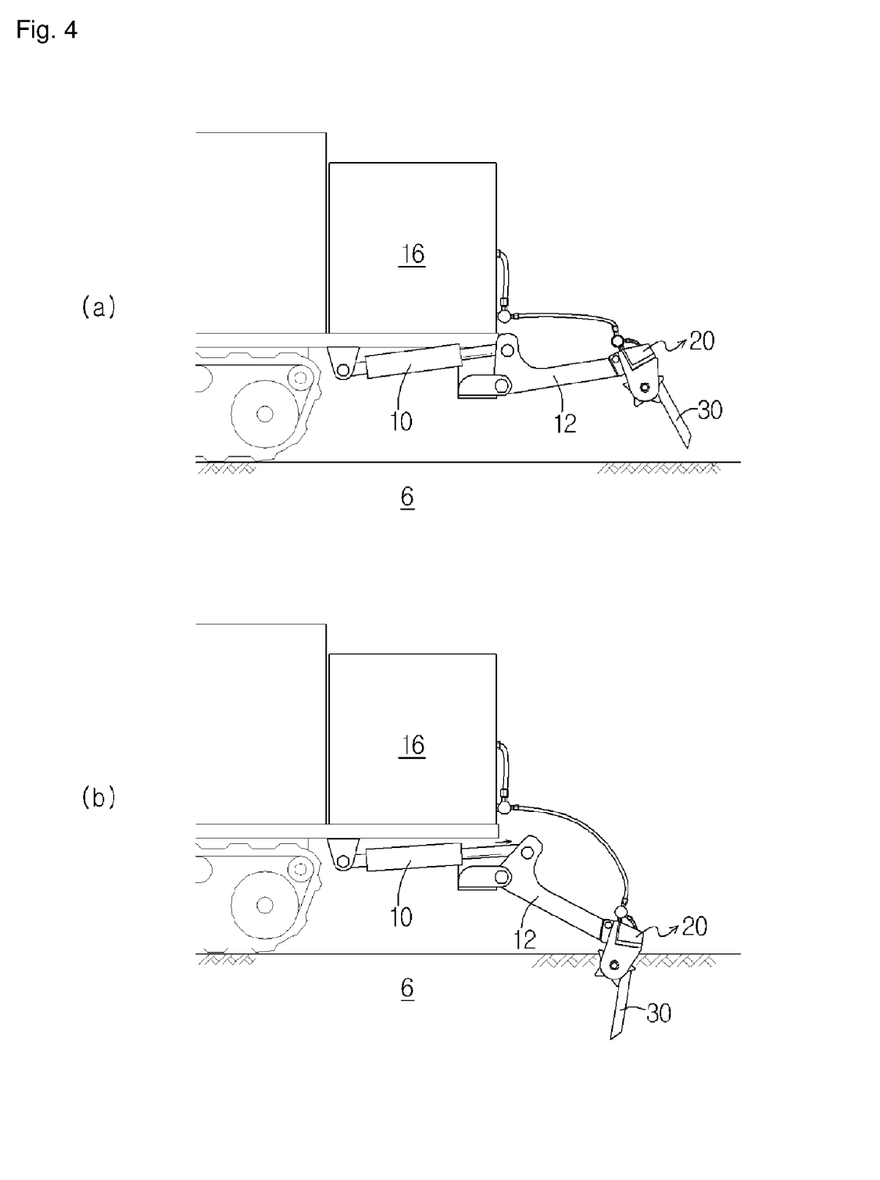
FIG. 4 is a view illustrating an operation state of a pest extermination operation unit according to the present invention.

FIGS. 2 and 3 are views illustrating a configuration of the pest extermination operation unit 4 which forms the steam type pest extermination apparatus according to the present invention, and FIG. 4 is a cross sectional view illustrating an operation state of the pest extermination operation unit 4 according to the present invention.

As illustrated in FIGS. 2 and 3, the pest extermination operation unit 4 installed at the rear of the autonomous power equipment 2 may include a lever plate 12 which is axially engaged to a shaft rod 14 and rotates as an operating cylinder 10 rotates, and a needle rod fixing plate 20 is engaged to the rear of the level unit 12.

The needle rod fixing plate 20 is provided to fixedly arrange a plurality of needle rods 30 at left and right sides and can be configured with a L-shaped bracket 22 which extends long left and right directions, and a reinforcing plate 24 may be further engaged with a bolt on the top thereof so as to more reliably fix the engaged needle rods 30.

The needle rod fixing plate 20 to which the needle rods 30 are engaged is engaged to an end of each of the left and right lever plates 12 and can move up and down with the aid of the operating cylinder 10. To this end, a plurality of needle rods 30 which are arranged horizontal on the needle rod fixing plate 20 can position floated above the ground or can penetrate into under the ground 6 as illustrated in FIG. 4 based on the expansion and contraction operations of the operating cylinder 10.

Figure 5:
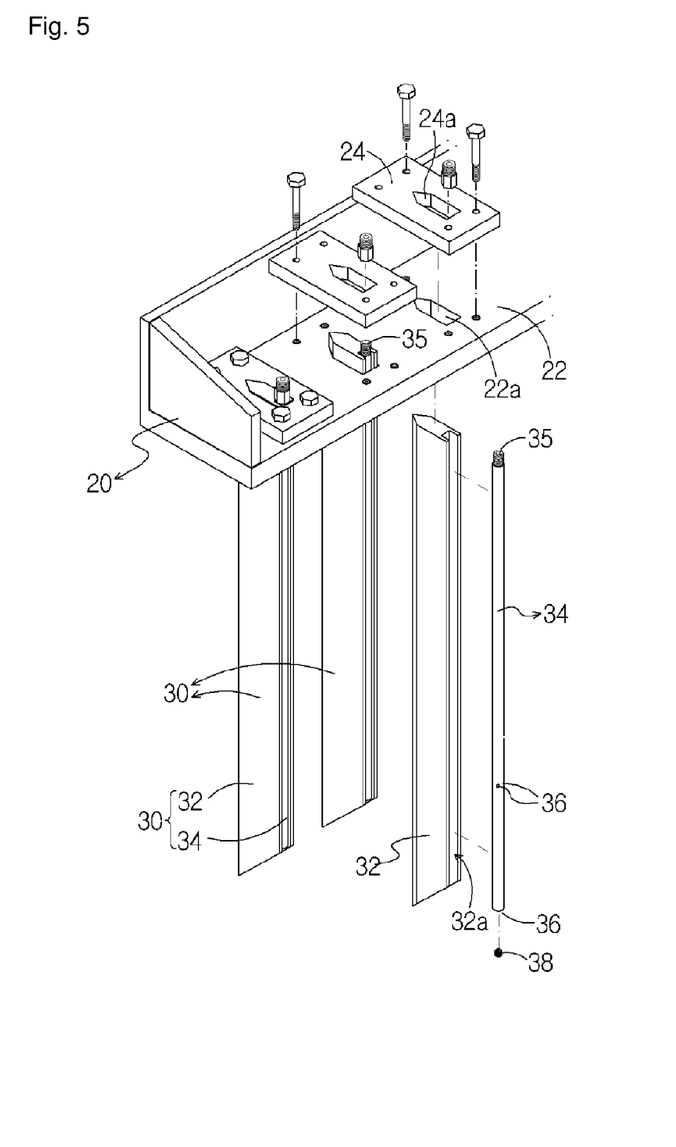
FIG. 5 is a view illustrating a configuration wherein needle rods are engaged to a needle rod fixing plate according to the present invention.

Referring to FIG. 5, engaging holes 22a and 24a may be formed at the L-shaped bracket 22 and the reinforcing plate 24 of the needle rod fixing plate 20, so the tops of the needle rods 30 are inserted into the engaging holes 22a and 24a. After the tops of the needle rods 30 are inserted and engaged, they are stably fixed using, for example, a welding method, etc. It is preferred that the shapes of the engaging holes 22a and 24a are consistent with the shapes of the tops of the needle rods 30.

The needle rod 30 according to the present invention extends long downward and upward, and it is about 20~50 cm long, and the needle rod 30 is formed with a lower end thereof having an inclined cross section, so it can be easily pocked into the ground 6.

The needle rod 30 equips with a man body member 32. A nozzle pipe body 34 is engaged, for example, by a welding method, to an engaging groove 32a formed at the rear of the main body member 32.

Since the main body member 32 of the needle rod 30 can stand a condition where it should move through the underground, it is preferably made of a special steel material which has a strong durability, and the front end of the main body member 32 is made sharp since it needs to easily move through the underground.

Figure 6:
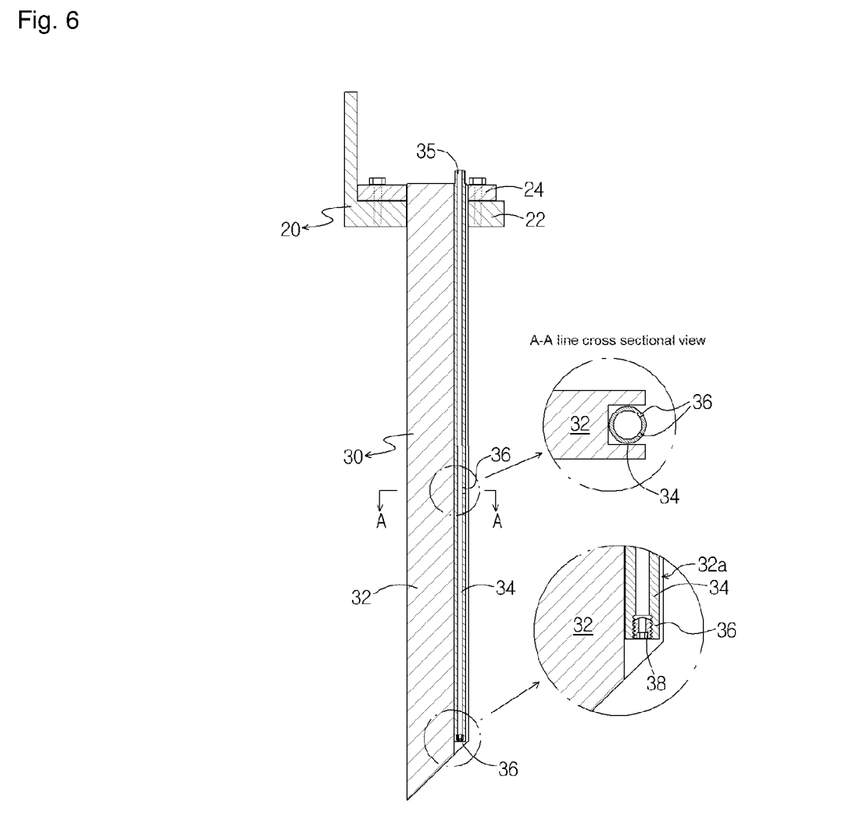
FIG. 6 is a cross sectional view illustrating a state where a needle rod is engaged to a needle rod fixing plate in FIG. 5.

Referring to FIG. 6, the nozzle pipe body 34 of the needle rod 30 is provided to finally spray the steam generated by the steam generation unit 16 into the ground and equips with on the top one steam inlet hole 35 connected to a hose, and a plurality of steam injection holes 36 are formed at the lower and lateral sides.

The steam injection hole 36 formed at the lower side among the steam injection holes 36 may be configured with a headless bolt 38 which passes through a through hole in the center. In the event that the headless bolt 38 is used, it is advantageous to easily adjust and form, using a drill, etc., the diameter of the steam injection hole 36. The smaller the diameter of the steam injection hole 36 is made, the stronger the steam can be sprayed into the ground 6.

It is preferred that the steam injection hole 36 formed at a lateral portion among the steam injection holes 36 is formed two in number at each of left and right sides at the angles of 30~50°. This configuration is provided to spray steam toward between the needle rod 30 and the needle 30, thus exterminating pest over all the portions without any missed portions.

In the present invention, as illustrated in FIGS. 1 and 2, in order to spray a high temperature steam via the steam injection holes 36 of the needle rod 30, a steam generation unit 16 and steam distributors 42 and 44 are provided, which are able to generate and supply steam. The steam generation unit 16 may include a water tank for storing water, and a boiler for boiling the water supplied from the water tank.

In the steam generation unit 16, the steam is generated and supplied in a superheated steam state, and it is preferred that for the sake of reliable pest extermination, the temperature of the steam being sprayed via the steam injection hole 36 of the needle rod 30 is over 130° C. in a form of steam.

For the steam generation method in the steam generation unit 16, both the dry type steam and wet type steam which is a saturated type steam are available. The dry type steam is advantages since it uses less water.

The temperature of the steam which generates by the steam generation unit 16 in general is about 150° C., and the temperature may drop to 100° C. until the steam moves and reaches the needle rod 30 via the hose In this case, it was confirmed the effect of pest extermination is lowered.

In the present invention, a steam distributor is provided at the hose which interconnects the steam generation unit 16 and the needle rod 30.

Figure 7:
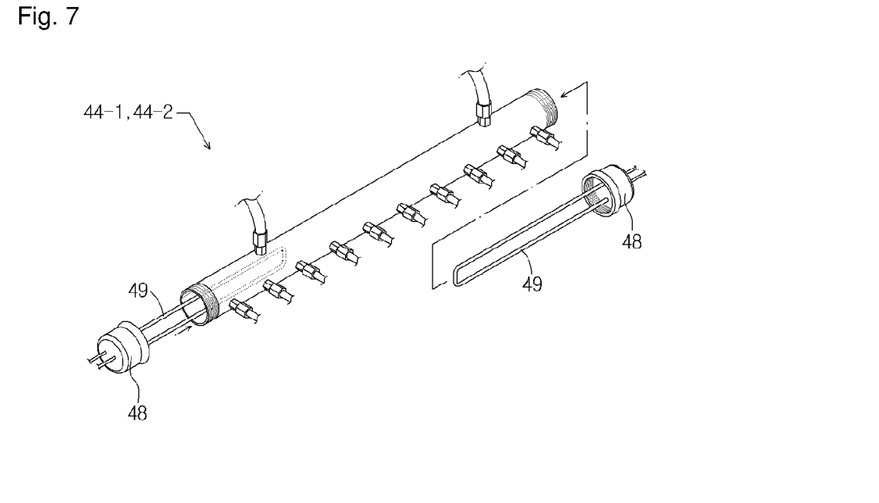
FIG. 7 is a view illustrating a detailed configuration of a steam distributor.

There may be provided one steam distributor. In the present invention, it may be formed of a first steam distributor 42 and second steam distributors 44-1 and 44-2 connected to the first steam distributor 42. As illustrated in FIG. 7, the second distributors 44-1 and 44-2 are formed like a pipe body to have a space in the inside thereof. A cover 48 is engaged using screws, etc. to both sides so as to seal the space.

In particular, an heating wire 49 may be provided inside the second distributors 44-1 and 44-2 so as to raise the temperature of the steam, thus implementing the function of a super heater. In the present invention, the above configuration is implemented in such a way that the heating wire 49 electrically connected to the cover 48 engaged to both ends of the second distributors 44-1 and 44-2 is arranged long.

This configuration is provided to keep the temperature of the steam at over 130° by reheating the steam just before the spraying which steam has a temperature dropped due to heat loss in the steam while the steam generated by the steam generation unit 16 reaches the needle rod 30 via the hose.

It is preferred that the second steam distributors 44-1 and 44-2 are arranged as nearest the needle rod 30 as possible. In the present invention, it is fixed at the L-shaped bracket 22 of the needle rod fixing plate 20. It is preferred that the hose is a flexible hose which is coated with a cloth material and has a good heat insulation property rather than a metallic pipe, for example, a copper pipe, a stainless pipe, etc.

Figure 8:
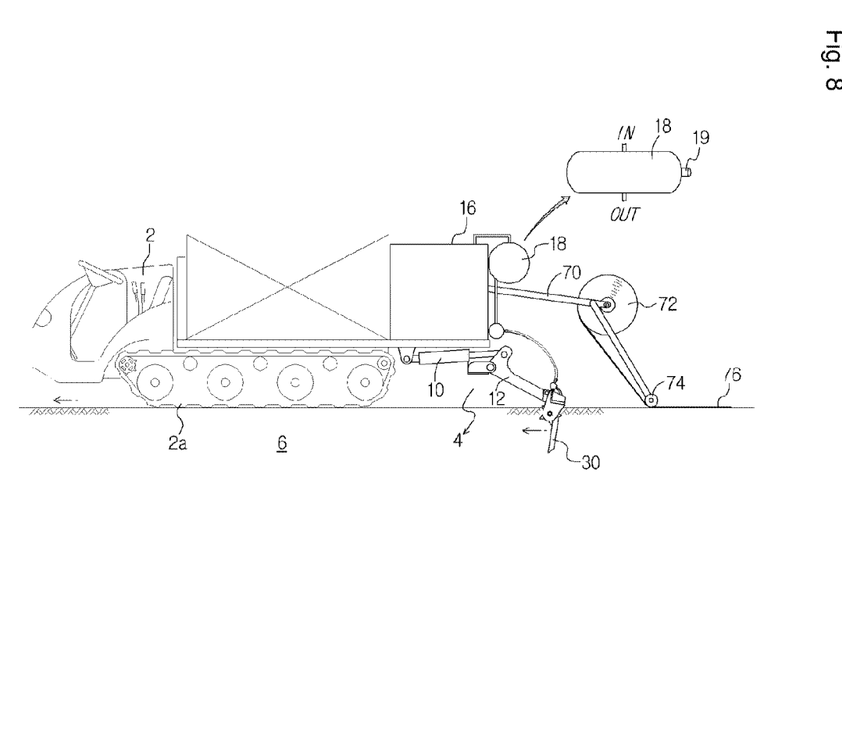
FIG. 8 is a use example view illustrating a state where a steam type pest extermination apparatus is installed at an autonomous power equipment according to another exemplary embodiment of the present invention.

Referring to FIG. 8, a steam auxiliary tank 18 may be installed between the steam generation unit 16 and the steam distributor. The steam auxiliary tank 18 is provided to keep the temperature by reheating the water which has been heated by the steam generation unit 16 and allows the steam to be sprayed via the steam injection hole 36 of each needle rod 30 through the steam distributor.

The steam auxiliary tank 18 is configured to heat using an electric heater 19, and the capacity of the tank is about 20 liter, and the electric capacity may be set at 2 kW for the sake of electric heating.

During the pest extermination operations, fragments, for example, tree branches, grass, stone, etc. being present underground or above the ground may be caught between the needle rods 30 due to the needle rods 30 which are arranged at left and right sides. If such fragments are caught too much by the needle rods 30, a reliable work proceeding may be interrupted, and machines may receive load.

The pest extermination operation unit 4 according to the present invention may further separately equip with a fragment removing unit 50 so as to reliably remove backward the fragments which are caught by the needle rods 30.

Figure 9:
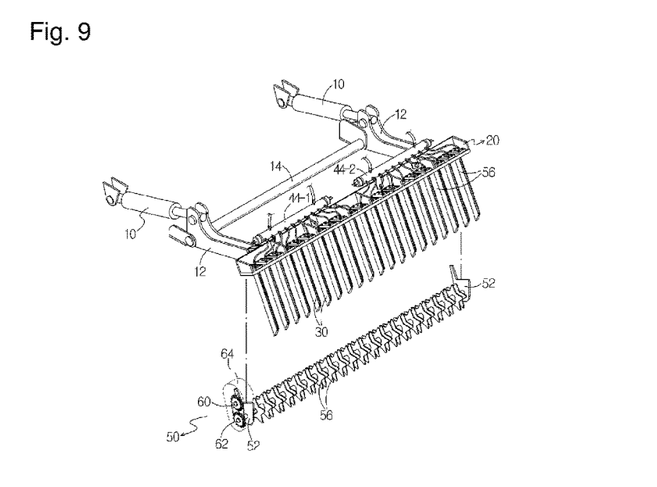
FIG. 9 is a view illustrating a configuration wherein a fragment removing unit is engaged to a pest extermination operation unit.
Figure 10:
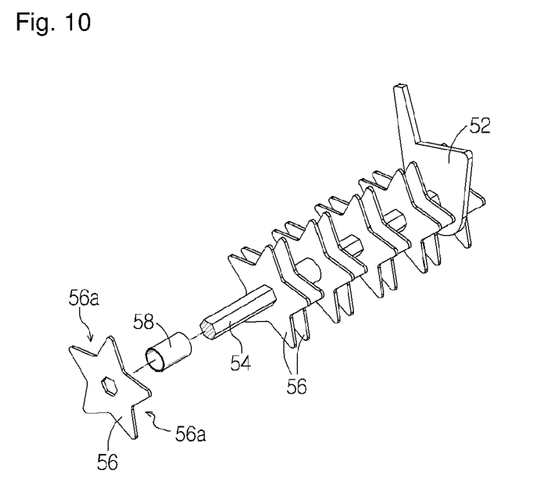
FIG. 10 is a detailed view illustrating a configuration of a fragment removing unit.

Referring to FIGS. 9 and 10, the fragment removing unit 50 may include a shaft support unit 52 at left and right sides, which are fixed by a welding method to the lower side of the L-shaped bracket 22 of the needle rod fixing plate 20, and a shaft rod 54 to which a plurality of rotation blades 56 are arranged and engaged is installed between the shaft support units 52.

A driven sprocket 62 is engaged to an end of one side of the shaft rod 54. The driven sprocket 62 may be connected via a chain to a driving sprocket 60 axially connected to a driving motor M, so the shaft rod 54 can rotate by the driving of the driving motor M. It is preferred that the driving motor M, the driving sprocket 60 and the driven sprocket 62 are covered with a protecting case 64.

As illustrated in FIG. 9, the shaft rod 54 has a hexagonal cross section, and a hexagonal engaging hole corresponding thereto is formed in the center of the rotation blade 56 engaged to the shaft rod, so they can fit each other, the configuration of which allows the rotation blades 56 to reliably rotate without any idle rotation when the shaft rod 54 rotates.

The rotation blade 56 may include a plurality of groove parts 56a on its outer circumference in a radial shape so as to easily catch fragments onto the needle rods 30 and to reliably discharge backward the fragments.

Referring to FIGS. 3 and 10, the rotation blade 56 may be configured in such a way that two rotation blades 56 are inserted between the needle rods 30. A tubular spacer 58 inserted into the shaft rod 54 may be inserted into between the two rotation blades 56, thus maintaining a predetermined interval between the neighboring rotation blades 56.

The fragment removing unit 50 is able to discharge backward the fragments which can be easily caught by the needle rods 30 as the rotation blades 56 engaged to the shaft rod 54 rotate by the driving motor M.

Figure 11:
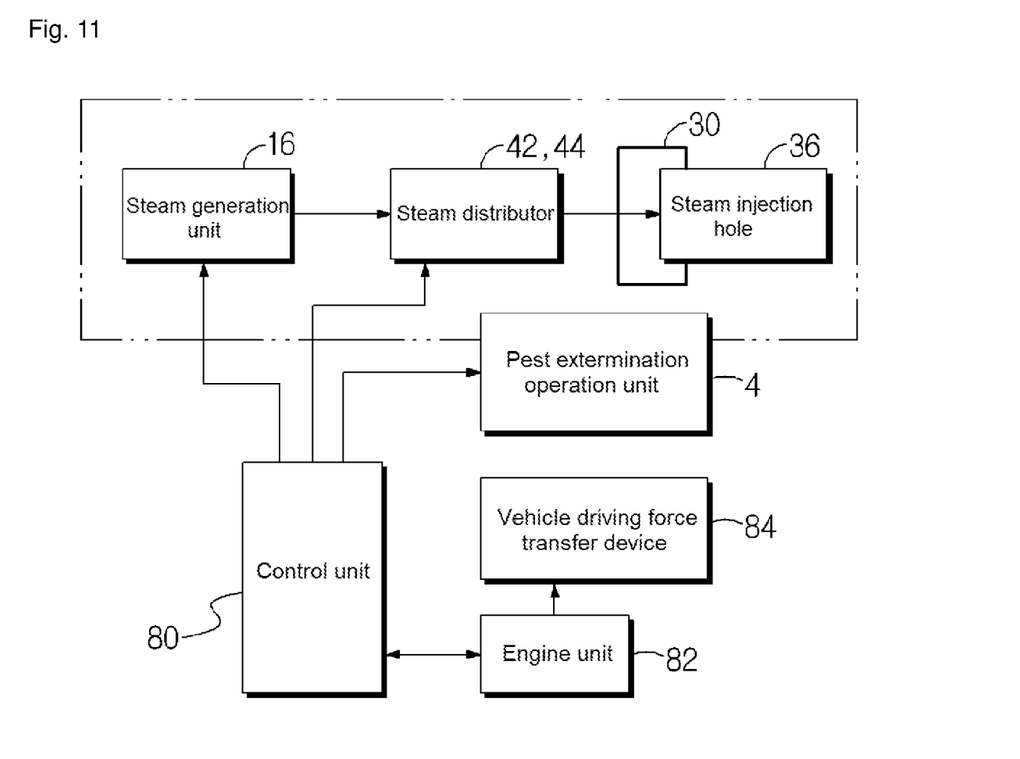
FIG. 11 is a view illustrating a function block of a steam type pest extermination apparatus according to an exemplary embodiment of the present invention.

FIG. 11 is a view illustrating a configuration of the function block of the steam type pest extermination apparatus according to an exemplary embodiment of the present invention. A control unit 80 is provided for the sake of an operation control of the pest extermination operation unit 4 engaged at the autonomous power equipment 2 having caterpillar wheels 2a and of an organic control of the autonomous power equipment 2. An engine unit 82 and a vehicle driving force transfer device 84 of the autonomous power equipment 2 may be controlled by the control unit 80 in the pest extermination mode.

When the autonomous power equipment 2 operates in the pest extermination mode, it will operate at a super slow speed, for example, moving 50~150 meters per hour. In a hot place, for example, in a greenhouse, or on a sand field or a raw land where direct light shines, the autonomous power equipment 2 may be driven unmanned thanks to the caterpillar wheels 2a which has a straightness.

The operation of the steam type pest extermination apparatus according to the present invention will be described below.

In an operation standby state as illustrated in FIG. 4A, when the autonomous power equipment 2 gets started, a plurality of the needle rods 30 installed and arranged horizontal at the needle rod fixing plate 20 at the rear end of the lever plate 12 of the pest extermination operation unit 4 descend since the operating cylinder 10 expands under control of the control unit 80 as illustrated in FIG. 4B and penetrate into the ground 6 which has in unhardened soft soil. In addition, a high temperature steam is generated by the steam generation unit 16, and the generated steam is sprayed via the steam injection hole 36 of each needle rod 30 via the first steam distributor 42 and then the second distributors 44-1 and 44-2.

In this state, when the autonomous power equipment 2 moves forward, a plurality of the needle rods 30 are dragged buried in the ground 6, and a high temperature steam is continuously injected into the ground 6, whereupon all the pest contacting with the high temperature steam can be exterminated.

The driving motor M of the fragment removing unit 50 is driven under the control of the control unit, and the rotation blades 56 engaged to the shaft rod 54, which rotates thereby, can rotate simultaneously, so the fragments, which can be easily caught by the needle rods 30, can be discharged backward.

As illustrated in FIG. 1, in order to enhance the sterilization effects using a high temperature steam, the damp proofing cover 76 unrolled from the winding-out roll 72 engaged at the autonomous power equipment 2 covers the soil where a high temperature steam has penetrated into the ground 6, thus keeping for a long time the high temperature steam retained in the ground 6.

When the pest extermination work is finished, a key corresponding to the extermination of the steam generation or the stop of the steam supply is inputted via a key input unit, etc., the generation of the steam by the steam generation unit 16 is stopped, and the supply of the steam to the needle rods 30 are stopped. In this state, the needle rod fixing plate 20 to which the needle rods 30 are engaged is lifted up above the ground by operating the operating cylinder 10.

According to the present invention, the pest and bacteria under the ground can be exterminated by injecting a high temperature steam without spraying agricultural pesticide, and it is safe and convenient to remove pest and harmful bacteria.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A steam type pest extermination apparatus in a pest extermination apparatus which is able to exterminate pest and harmful bacteria, comprising:
    a pest extermination operation unit comprising a needle rod fixing plate, needle rods, a lever plate, and an operating cylinder, wherein the needle rods are arranged and fixed at left and right sides thereof and coupled with the lever plate rotated upward and downward by an operating cylinder at a backside of an autonomous power equipment;
    a steam generation unit which is provided to generate high-temperature steam enabling insect extermination and sterilization and supply the steam to steam injection holes of the needle rods, wherein the steam generation unit and the needle rods are connected by a hose,
    a steam distributor for supplying the steam to each of the needle rods is provided on the hose, both ends of the steam distributor being coupled with a cover so as to be sealed, wherein a heating wire for increasing the temperature of the steam again is provided in the cover; and
    a control unit which controls the autonomous power equipment, wherein the autonomous power equipment operates such that the needle rods move forward buried in the ground, and the high temperature steam is continuously injected into the ground.

2. The apparatus of claim 1, wherein each of the needle rods includes a main body member which extends long upward and downward, a nozzle pipe body engaged to an engaging groove at the rear of a main body member, one steam inlet hole connected with a hose and formed on the top of the nozzle pipe body, and a plurality of steam injection holes formed at a lower side and a lateral side.

3. The apparatus of claim 2, wherein the steam injection hole formed at a lower side among the steam injection holes of the nozzle pipe body is configured by engaging a headless bolt which passes through in the center, and the steam injection hole formed at the lateral side is provided two in number at each of left and right sides at the angles of 30~50°.

4. The apparatus of claim 1, further comprising:
    a fragment removing unit which includes a shaft support unit at left and right sides thereof, and a shaft rod, wherein a plurality of rotation blades are engaged between the shaft support units, a driven sprocket is engaged to an end of one side of the shaft rod, the driven sprocket is connected via a chain to a driving sprocket axially engaged to a driving motor, and the rotation blades engaged to the shaft rod can rotate by the driving of the driving motor, and fragments, which can be easily caught by the needle rods, can be reliably discharged backward.

5. The apparatus of claim 4, wherein the rotation blade includes a plurality of groove parts on its outer circumference in a radial shape in order for the fragments to be caught, and a tubular spacer inserted in the shaft rod is inserted between the rotation blades, so the interval between the neighboring rotation blades 56 can be maintained.

* * * * *